United States Patent [19]

Diepers

[11] 4,314,172

[45] Feb. 2, 1982

[54] CURRENT TRANSFER BRUSH

[75] Inventor: Heinrich Diepers, Höchstadt, Fed. Rep. of Germany

[73] Assignee: Siemens Aktiengesellschaft, Munich, Fed. Rep. of Germany

[21] Appl. No.: 20,402

[22] Filed: Mar. 14, 1979

[30] Foreign Application Priority Data

Apr. 20, 1978 [DE] Fed. Rep. of Germany ....... 2817371

[51] Int. Cl.³ ............ H02K 13/00

[52] U.S. Cl. ............ 310/248; 310/242; 428/607

[58] Field of Search ............ 310/248-253, 310/239, 242; 428/607

[56] References Cited

U.S. PATENT DOCUMENTS

| | | | |
|---|---|---|---|
| 701,369 | 6/1902 | Mills | 310/248 |
| 936,692 | 10/1909 | Apple | 310/248 |
| 2,125,027 | 7/1938 | Kasperowski | 310/248 |
| 2,543,301 | 2/1951 | Ramadanoff | 310/248 |
| 2,959,698 | 11/1960 | Titus | 310/248 |
| 3,270,306 | 8/1966 | Burski | 310/248 |
| 3,274,304 | 9/1966 | Horton | 310/252 |
| 3,509,400 | 4/1970 | Conrath | 310/248 |

FOREIGN PATENT DOCUMENTS

| | | | |
|---|---|---|---|
| 2147938 | 3/1973 | Fed. Rep. of Germany | 310/248 |
| 441748 | 1/1936 | United Kingdom | 310/248 |
| 1421296 | 1/1976 | United Kingdom | 310/248 |

*Primary Examiner*—R. Skudy
*Attorney, Agent, or Firm*—Kenyon & Kenyon

[57] ABSTRACT

A current transfer brush with several slider members made of stacked arrangement of foils of highly graphitized graphite extending at least approximately perpendicular to the contact surface of the brush. At least one of the two flat sides of at least some of the graphite foils can be provided with a layer of an electrically conductive material.

15 Claims, 1 Drawing Figure

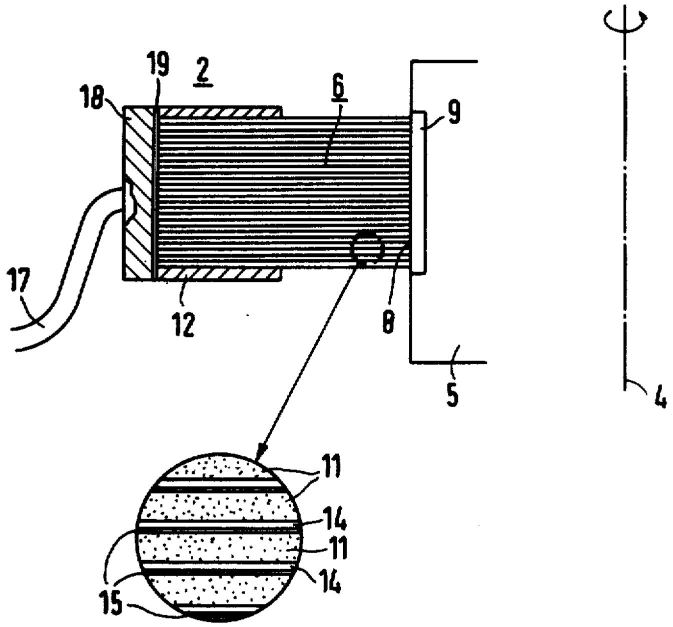
19
2
18
6
9
17
12
8
5
4
11
14
11
14
15

CURRENT TRANSFER BRUSH

BACKGROUND OF THE INVENTION

This invention relates to current transfer brushes in general and more particularly to such a brush with several parts of graphite which are combined to form a slider member and extend at least approximately perpendicular to the contact surface of the brush.

The brushes used in electric machines transfer current between a stationary machine part and a rotating machine part. They generally consist of electro graphite, natural graphite or a mixture of a metal and graphite. For, the use of graphite parts ensures good conductivity of the brush and, at the same time, good sliding properties on the contact member connected to the rotating machine part, for instance, a slip ring or a commutator.

The running properties of such a brush are determined mainly by the friction coefficient $\mu$ as a function of the circumferential velocity of the contact member connected to the rotating machine part and by the voltage drop $\Delta U$ as a function of the current density transferred via the brush. Both quantities depend heavily on the extraneous skin formed on the rotating contact member, which skin is also called a film or patina. This extraneous skin is composed of materials of the brush and the contact member which were abraded in operation. Its thickness and nature is influenced by many factors. Thus, it is determined, for instance, by the material composition of the graphite and the contact member, by the current density provided and by the circumferential velocity and the temperature of the contact member. In addition, it depends on the contact pressure of the brush and especially also on the continuously changing effects of the atmosphere such as ground and altitude climate, air humidity and chemically agressive gases and vapors.

It has now been found that in d-c machines a maximum current density or current carrying capacity of up to about 12 A/cm$^2$ can be obtained with such graphite brushes in continuous operation. Brushes which contain a sintered member of graphite and metal for use as the sliding member are generally provided for circumferential velocities of up to about 25 m/sec, while brushes of electro graphite are suitable for circumferential velocities of up to about 40 m/sec and brushes of natural graphite up to about 80 m/sec. The maximum velocity is generally reached only in large turbo-generators. For commutator machines, on the other hand, brushes of electro graphite are mainly used. The maximum current carrying capacity of these brushes is about 30 A/cm$^2$ at circumferential velocities of the commutators of up to 45 m/sec.

These brushes can contain graphite member or sintered member of graphite and metal as the slider member. In addition, brushes are also known, having slider members composed of two or more layers with the same brush material, for instance, by cementing.

Since the rotating slip rings or commutators of such machines can never be made perfectly round, additional contact resistance occurs at increased circumferential velocities. This is due, in particular, to the fact that not all parts of the contact area of the slider member make uniform contact with the slip ring or the communtator. In order to meet this difficulty, a relatively high brush pressure must be generally provided, which leads to an undesirable increase of the friction coefficient $\mu$ of the brush and to correspondingly greater wear.

SUMMARY OF THE INVENTION

It is therefore an object of the present invention to provide a current transfer brush, in which these difficulties do not occur or only insignificantly so. In particular, this brush is to permit a relatively low brush pressure even at high circumferential velocities and still have a relatively low contact resistance. In addition, this brush should be usable for all types of machines, i.e., for slip rings and commutators.

According to the present invention, this problem is solved for a current transfer brush of the type mentioned at the outset by proving a slider member which contains a stacked arrangement of foils of a highly graphitized graphite.

A highly graphitized graphite is understood here to be a graphite material which contains a high percentage of crystallized graphite. This material is particularly well suited for brushes, as it has very good sliding properties on metallic contact members such as slip rings and commutators.

The advantages of this design of the current transfer brush are further that the graphite foils arranged perpendicular to the contact surface of the electric machine are relatively flexible and that, in conjunction with the laminar construction, a higher density of contact points in the contact surface can be obtained, since the running properties of the brush are improved by the flexibility of the foils and the laminar structure. Although the instataneous brush pressure varies due to the irregular running of the rotating machine part, which can never be avoided completely, a relatively constant contact resistance between the rotating contact member and the contact brush is ensured due to the flexibility.

In addition, better cooling of the slider member is achieved with the stacked arrangement of graphite foils in comparison to a slider member with an electro graphite block. Particularly good cooling is obtained by the air stream when the plane of the foils is arranged perpendicular to the axis of rotation of the contact member.

In addition, the slider body has a strongly anisotropic structure; its electric and thermal conductivity are substantially higher in the plane of the foils, i.e., in the current transfer direction, than perpendicularly thereto. Such a current transfer brush is especially well suited as a commutator brush. It influences the commutation electrically as well as mechanically, as it is well known that the contact resistance, the stability of the resistance versus high current densities and the number of the contact points have a large influence on the quality of the commutation of the machine. It is well known that the mechanical running properties affect the commutation time; this time is shortened in a non-reproducible manner. For, in spite of perfect mechanical conditions, spark formation can occur if the brush, while having a high longitudinal current carrying capacity in the foil plane does not provide the required contact resistance in the short circuit loop of the commutating coil. With the design of the current transfer brush according to the invention, this difficulty is circumvented by the provision that, in addition to the contact resistance in the direction of the current flow, still further resistances due to the laminated slider member are inserted into the commutating circuit, in that the transition resistances between adjacent graphite foils are added. According to a further embodiment of the current transfer brush, a further increase of the resistance in the cummutating circuit is obtained by the provision that graphite foils with a higher electric conductivity in the current transfer direction than in the direction perpendicular to the plane of the foils are used.

It may further be advantageous in the current transfer brush according to the present invention if at least one of the flat sides of at least some of the graphite foils is provided with a layer of an electrically conductive material. The slider member is then of particularly low resistance in the direction of the current flow, i.e., parallel to the plane of the foils, so that its voltage drop is correspondingly small. In addition, the heat removal from the contact zone can also be aided by these measures.

BRIEF DESCRIPTION OF THE DRAWING

The single FIGURE is a diagrammatic cross section through a current transfer brush according to the present invention.

DETAILED DESCRIPTION OF THE INVENTION

The brush 2 shown in the FIGURE is connected rigidly to a stationary part of an electric machine, not detailed in the figure. To transfer the current between this stationary machine part and a rotating machine part 5 which rotates about an axis 4 but is merely indicated in the FIGURE, the slider element 6 of brush 2 slides on the cylindrical outer or running surface 8 of a contact member 9 connected to the rotating machine part 5. It will be assumed, for instance, that the running surface 8 is the contact surface of the commutator 9 of a commutator machine. The running surface 8 can also be, however, the contact surface of a slip ring of a D.C. or A.C. machine.

According to the present invention, the slider member 6 of the brush 2 contains a stacked arrangement of a multiplicity of graphite foils 11, whose ends facing away from the rotating machine part 5 are held together mechanically by a frame element 12, for instance, a copper frame. Graphite foils 11 may be commercially available foils with a high degree of graphite crystallization (for instance, those sold by Sigri Elektrographit GmbH, D-8901 Meitingen under the name Sigraflex). Such foils are made by the thermal decomposition of graphite inclusion compounds. The graphite flakes so produced are processed into foils by pressing or rolling without the addition of fillers or binders. The thickness of the graphite foils 11 used for the brush 2 is advantageously less than 1 mm, and in particular, less than 200 $\mu$m. The foil material is advantageously highly anisotropic. Thus, with a raw density of the graphite material of 1 g/cm$^3$ and at a temperature of 20° C., for instance, an electric resistivity of 1000 $\mu$ohm.cm is obtained in the longitudinal direction of the foil and a thermal conductivity of 220 W/mK, while, perpendicularly thereto, the corresponding values are around 65,000 $\mu$ohm.cm and 7 W/mK, respectively.

The brush 2 is arranged so that its foils 11 are perpendicular to the running surface 8 of the rotating commutator 9 of the machine. In addition, the flat sides of these graphite foils 11, in the case of the assumed commutator machine, advantageously lie in planes perpendicular to the axis of rotation 4 of the rotating machine part. For, in spite of the flexibility of the slider member 6, excessive bending of the individual foils in the direction of rotation is avoided with this arrangement of the graphite foils 11, and an approximately constant relationship between the dimension of the slider member 6 with respect to the dimensions of the commutator laminations covered by it is assured. In the case of D.C. or A.C machines with slip rings as the rotating contact members, the brush can also be arranged so that its graphite foils 11 are in planes parallel to the axis of rotation 4.

Each of the graphite foils 11 is coated on one side with a layer 14 of a conductive metal, e.g., copper, silver or a two-component or multiple-component alloy. A silver layer is preferred. This layer can be applied by the known thin-film processes such as electroplating, chemical electroless plating, plasma or ion plating, by sputtering or vapor deposition. The vapor deposition technique is preferred, as thereby, good adhesion of the layer material on the graphite material is obtained. In any event, heavy heating of the graphite foil to above 100° C. must be avoided during the coating process, as otherwise the foil is degased too much and the adhesion of the electrically conductive material becomes poorer.

The thickness of the layer applied can be, for instance, between 0.1 $\mu$m and 500 $\mu$m and preferably, between 1 and 50 $\mu$m. As is further indicated in the FIGURE, the layers 14 of the electrically conductive material are additionally covered with a thin film 15 which is used, in particular, as corrosion protection for the layer 14 and consists, for instance, of cobalt, chromium or nickel, with such a layer 15, a silver layer, among others, can be shielded against the effects of sulfur from the atmosphere.

Such graphite foils 11, combined in a stack and coated with an electrically conductive material, are hard to solder to a current feed or take-off lead at their ends located in the copper frame 12. This is due, in particular, also to the fact that, because of the advantageous anisotropy of the electric conductivity of the slider member 6, i.e., its transversal resistance, each foil must individually be provided with a contact surface at its ends. It is therefore provided that these ends are connected to a contact plate 18 connected to a current feed or take-off lead, e.g., a copper cable 17, by means of a layer 19 of conductive adhesive in an electrically conducting manner. Suitable conductive adhesives are, for instance, conductive silver pastes, conductive epoxy adhesives or conductive silicone adhesives which contain electrically conductive material in finely powdered form and are hardened by a heat treatment or also at room temperature. In the case of commutator applications, the conductivity of the adhesive must be selected in such a manner and the layer thickness must be made thin enough that the high transversal resistance of the slider member is not shunted appreciably. Similar criteria also apply to the choice of the material for the contact plate 18 and its geometric dimensions.

According to embodiment of the FIGURE, a coating of the graphite foils 11 on one side is provided. However, the coating can also be applied on both sides; also a different layer thickness and optionally, also different materials can be applied to the two flat sides of each graphite foil 11.

By coating the graphite foils 11 which an electrically conductive material, a kind of composite brush is produced, wherein the electrically conducting parts of the brush serve for particularly good conduction of the current with low resistance, and the graphite parts of the brush serve as carrier material for the electrically conducting layers 14 as well as a lubricant.

In the direction of the current flow, i.e., parallel to the planes of the foils, the slider member 6 has relatively low resistance and, if the foils are additionally coated with metal, a very low resistance. The heat produced in the contact surface can be removed quickly along the foils in the direction toward the brush frame 12, 18, so that the contact temperature is kept correspondingly low, especially even under loads which are several times higher than the load limits of the brushes used heretofore. In addition, the electrical loading of the brush, e.g., its current density, can be increased, even at velocities of 80 m/sec, to several times the load limit of the brushes used heretofore. The brush can therefore be used in high-performance turbo-generators.

Through suitable choice of the thickness and the raw density of the foils, the thickness of the metal layers applied thereto as well as the packing or stacking density, the brush according to the present invention can be adapted optimally to different machine types without the need to change the manufacture of the brushes appreciably each time. In addition, a locally different current density can be adjusted through the use of coated and uncoated foils or foils with a different coating thickness in a brush and, in a particular arrangement, by advantageously using, for instance, at the trailing or the leading edge of the brush, uncoated foils or foils which are coated thinly with less highly conductive material and therefore have higher resistance. may be advantageous to use layers of a high melting point material with a vapor pressure which is low at higher temperatures, to make the formation of sparks at the trailing edge of the brush more difficult and to transfer less brush material.

EXAMPLE

According to one example, the current transfer brush according to the present invention contains 115 graphite foils, each 150 μm thick, about 5 cm long and 2 cm wide. Commercially available graphite foils are used as the foil material (Sigri; Sigraflex-F). The foil material exhibits a strong anisotropy as to its thermal and electrical properties. Each of these graphite foils is covered on both sides with a silver layer 5 μm thick. The graphite foils combined to form a stack are held in a copper frame with a square inside aperture of 2×2 cm and electrically connected to a copper cable by means of a conductive silver paste. A slip ring of chrome-nickel steel is provided as the contact body of a rotating machine part, which turns underneath the brush with a velocity of revolution of 46 m/sec. For this brush, a current-carrying capacity of 90 $A/cm^2$ is then obtained, while a friction coefficient $\mu$ smaller than 0.1 is maintained. With plus polarity, a voltage drop $\Delta U$ of about 1.05 V is then obtained across the entire brush including the contact zone, and with minus polarity, approximately 1.2 V.

In the example and in the FIGURE, it is assumed that a current is transferred between a rotating and a stationary machine part by the brush according to the invention. However, the use of the brush is not limited to cylindrical contact surfaces 8. The brush according to the present invention can be provided equally well also for use with stationary, elongated current bars.

What is claimed:

1. A current transfer brush comprising:

(a) a flexible slider member formed of a plurality of separate and individual flexible foils of a highly graphitized graphite in a stacked arrangement, at least one of the flat sides of at least some of said foils provided with a layer of electrically conductive material, said foils extending at least approximately perpendicular to the contact surface of the brush; and (b) current supply means to which one end of each of said individual flexible foils facing away from the contact surface of the brush is bonded, said current supply means containing a frame element at said end, said frame element holding together said individual flexible foils, said bonding and said holding existing only at said one end.

2. A current transfer therefore brush according to claim 1, wherein said graphite foils have an electric and thermal conductivity higher in the current transfer direction than in a direction perpendicular to the plane of the foils.

3. A current transfer brush according to claim 1, wherein the thickness of the graphite foils is less than 1 mm.

4. A current transfer brush according to claim 3, wherein said thickness is less than 200 μm.

5. A current transfer brush according to claim 1, wherein said graphite foils have different thickness.

6. A current transfer brush according to claim 1, wherein said layer is selected from the group consisting of copper, silver and a two-component or multi-component alloy with at least one of these materials.

7. A current transfer brush according to claim 1, wherein the thickness of said layers of the electrically conductive material applied to the graphite foils is between 0.1 μm and 500 μm.

8. A current transfer brush according to claim 1, wherein the thickness of the layers of the electrically conductive material applied to different graphite foils is different.

9. A current transfer brush according to claim 1, wherein the two flat sides of said graphite foils are coated with different electrically conductive materials.

10. A current transfer brush according to claim 1, and further including a protective layer on the layers of the electrically conductive material.

11. A current transfer brush according to claim 10, wherein said protective layer is of a material selected from the group consisting of cobalt, nickel and chromium.

12. A current transfer brush according to claim 1, wherein at least some of the graphite foils are provided with a layer of high melting point material.

13. A current transfer brush according to claim 1, wherein the flat sides of the graphite foils are arranged in planes perpendicular to the axis of rotation of a rotating contact member which the brush slider member is sliding on.

14. A current transfer brush according to claim 1 wherein at least one flat side of all of said graphite foils is provided with a layer of an electrically conductive material.

15. A current transfer brush according to claim 1 wherein said current supply means comprise a current feed lead terminating in a contact plate and conductive adhesive bonding and establishing contact of said coated graphite foils with said current feed lead.

* * * * *